United States Patent
Robshaw et al.

(10) Patent No.: US 9,219,612 B2
(45) Date of Patent: Dec. 22, 2015

(54) METHOD OF MUTUALLY AUTHENTICATING A READER AND A RADIO TAG

(75) Inventors: Matthew Robshaw, Herblay (FR); Henri Gilbert, Bures sur Yvette (FR)

(73) Assignee: France Telecom, Paris (FR)

( * ) Notice: Subject to any disclaimer, the term of this patent is extended or adjusted under 35 U.S.C. 154(b) by 865 days.

(21) Appl. No.: 13/380,961

(22) PCT Filed: Jun. 25, 2010

(86) PCT No.: PCT/FR2010/051301
§ 371 (c)(1),
(2), (4) Date: Apr. 26, 2012

(87) PCT Pub. No.: WO2010/149937
PCT Pub. Date: Dec. 29, 2010

(65) Prior Publication Data
US 2012/0200386 A1    Aug. 9, 2012

(30) Foreign Application Priority Data
Jun. 26, 2009    (FR) ..................................... 09 54367

(51) Int. Cl.
*G06F 7/04* (2006.01)
*H04L 9/32* (2006.01)
*H04L 9/30* (2006.01)

(52) U.S. Cl.
CPC ............ *H04L 9/3273* (2013.01); *H04L 9/3013* (2013.01); *H04L 9/3066* (2013.01); *H04L 9/3218* (2013.01); *H04L 2209/805* (2013.01)

(58) Field of Classification Search
CPC ... H04L 9/3013; H04L 9/3066; H04L 9/3273; H04L 9/3218; H04L 9/3033; H04L 2209/805

USPC ......... 340/5.8, 5.61, 10.1, 572.1; 380/286, 46
See application file for complete search history.

(56) References Cited

U.S. PATENT DOCUMENTS

| | | | |
|---|---|---|---|
| 2004/0066278 A1* | 4/2004 | Hughes et al. | 340/10.1 |
| 2007/0192602 A1* | 8/2007 | Blom et al. | 713/169 |
| 2010/0001840 A1* | 1/2010 | Kang et al. | 340/10.1 |

FOREIGN PATENT DOCUMENTS

EP      2063375 A1    5/2009

OTHER PUBLICATIONS

English translation of the International Preliminary Report on Patentability and Written Opinion dated Jan. 17, 2012 for corresponding International Application No. PCT/FR2010/051301, filed Jun. 25, 2010.

(Continued)

*Primary Examiner* — Edwin Holloway, III
(74) *Attorney, Agent, or Firm* — David D. Brush; Westman, Champlin & Koehler, P.A.

(57) ABSTRACT

A method and apparatus are provided for mutually authenticating a reader and a radio tag. The method includes: a step of the tag sending data to the reader, the data enabling an index to be determined for identifying an authentication coupon of the reader, the index being selected by the tag; a step of the reader obtaining the coupon from the determined index and of the reader sending the coupon to the tag; a step of the tag obtaining an authentication value from the selected index and of the tag verifying that the coupon received from the reader corresponds to the authentication value that is obtained, if the verification is positive, then a step of finalizing the authentication of the tag by the reader; and if the verification is negative, interrupting the mutual authentication method.

9 Claims, 3 Drawing Sheets

(56) References Cited

OTHER PUBLICATIONS

French Search Report and Written Opinion dated Apr. 12, 2010 for corresponding French Application No. FR 0954367, filed Jun. 26, 2009.

International Search Report and Written Opinion dated Nov. 12, 2010 for corresponding International Application No. PCT/FR2010/0510301, filed Jun. 25, 2010.

Konidala et al., "A Simple and Cost-Effective RFID Tag-Reader Mutual Authentication Scheme", Jul. 2007, XP007912467, Proceedings of International Conference on RFID Security (RFIDSec) '07. URL:http://rfidsec07.etsit.uma.es/slides/papers/paper-43.pdf.

Poschmann, "Lightweight Cryptography—Cryptographic Engineering for a Pervasive World", Apr. 30, 2009, XP007912470, Ruhr University Bochum. URL:http://eprint.iacr.org/2009/516.pdf.

McLoone et al., "Public Key Cryptography and RFID Tags" Jan. 1, 2007, Topics in Cryptology—CT-RSA 2007 Lecture Notes in Computer Science; ; KNCS, Springer, Berlin, DE, pp. 372-384, XP019053637.

\* cited by examiner

METHOD OF MUTUALLY AUTHENTICATING A READER AND A RADIO TAG

CROSS-REFERENCE TO RELATED APPLICATIONS

This Application is a Section 371 National Stage Application of International Application No. PCT/FR2010/051301, filed Jun. 25, 2010, which is incorporated by reference in its entirety and published as WO 2010/149937 A1 on Dec. 29, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The disclosure relates to a technique for mutually authenticating a reader and a radio tag.

A particularly advantageous application of the disclosure lies in the field of radio frequency identification (RFID).

BACKGROUND OF THE DISCLOSURE

RFID is a technique for storing and recovering data remotely by using markers known as radio tags or RFID tags. A radio tag is a small item, such as a sticky label, and it is suitable for being stuck on or incorporated in items or goods. It comprises an antenna associated with an electronic chip enabling it to receive and respond to radio requests transmitted from a transceiver referred to as a reader. For example, radio tags are used to identify people when the tags are incorporated in passports, or in travel tickets, or payment cards, or to identify goods like a bar code.

In conventional manner, when a tag comes within the range of a radio reader, the reader interacts with the tag and interrogates it. During such an interrogation, the reader can recover information that is specific to the tag, such as a tag identifier, or conventionally data that participates in authenticating the tag with a reader. This facility whereby a reader can recover information from a tag in spontaneous manner is not without drawbacks in terms of security. It can happen that the reader is corrupted and under the control of an illintentioned person, and in certain circumstances spontaneous recovery of information from a tag contributes to using up the authentication resources specific to the tag. This can contribute to perpetrating a denial-of-service attack against the tag. It would therefore be advantageous for a tag to be able to distinguish in one way or another between a reader that is authentic or legitimate, and a reader that is corrupt. In order to distinguish a legitimate reader from a corrupt reader, it then becomes necessary for the tag to authenticate the reader before authenticating itself with the reader.

There are several schemes in existence for authenticating a tag with a radio reader. By way of example, a "GPS" authentication scheme (or "cryptoGPS scheme") is known when its name is derived from the names of the inventors Girault, Paillés, Poupard and Stern [M. Girault, G. Poupard, and J. Stern, "On the fly authentication and signature schemes based on groups of unknown order", Journal of Cryptology, pp. 463-488, Vol. 19, No. 4, 2006]. The GPS scheme is a public key authentication scheme based on the discrete logarithm problem in a multiplicative group. GPS is conventionally used so that a device, usually a device having very little calculation power, such as a radio tag, can authenticate itself with a second device, typically a device having more power, such as a radio reader. The scheme is such that the calculation costs involved in authentication for the less powerful device can be considerably reduced by means of a certain number of optimizations, and in particular by the use of "coupons". With GPS, the more costly calculations are performed by the more powerful device. This characteristic makes the GPS protocol very well suited to authenticating radio tags with radio readers. Nevertheless, it is not easy to transpose that scheme in such a manner as to enable a tag, to authenticate a reader. A mere transposition of that scheme to enabling the tag to authenticate the reader would give rise to costly calculation being performed by the radio tag which continues to be a device that is very limited in terms of calculation power.

SUMMARY

An exemplary embodiment of the disclosure relates to a method of mutually authenticating a reader and a radio tag, the method comprising:

a step of the tag sending data to the reader, the data enabling an index to be determined for identifying an authentication coupon of the reader, the index being selected by the tag;

a step of the reader obtaining the coupon from the determined index and of the reader sending the coupon to the tag;

a step of the tag obtaining an authentication value from the selected index and of the tag verifying that the coupon received from the reader corresponds to the authentication value that is obtained;

if the verification is positive, then a step of finalizing the authentication of the tag by the reader; and if the verification is negative, interrupting the mutual authentication method.

The authentication method of an embodiment of the invention enables the reader to be authenticated by the tag. Success in performing this authentication also determines whether or not the more conventional authentication of the tag by the reader is performed.

It should be observed that the literature proposes several methods of authenticating RFID tags with a radio reader. For example, one known method is based on the asymmetrical GPS encryption algorithm based on precalculated coupons that are stored in the tag. That constitutes an optimization of the GPS scheme that is well adapted to radio tags. An authentication coupon of the tag is then consumed ("used up") by the tag during a current authentication with the reader. Authentication then takes place on the basis of a question and a response making use of the coupon. Given such a method, it might be tempting to use the same scheme for authenticating the radio reader by the tag, for example by interchanging the operations performed by the two devices. However, it should be observed that the resources available to a tag are extremely limited, both in terms of memory and in terms of calculation power, and that a mere transposition of the operations between the reader and the tag is unsatisfactory.

For authenticating the reader by the tag, the mutual authentication method of an embodiment of the invention is based on secret key cryptography, and as a result it is entirely viable. It is used in conjunction with an authentication scheme that is known for authenticating the tag by the reader, e.g. the GPS scheme, which is a cryptosystem having a public key that is well suited to authenticating a tag with a reader. This can be performed without significant implementation costs for the tag.

Thus, the method of an embodiment of the invention provides a tag with means for beginning by authenticating a reader before the tag authenticates itself to the reader.

When illustrated in the particular circumstance of authenticating a tag with a reader using the GPS scheme with precalculated tag authentication coupons $x_i$, it should be observed that preliminary authentication of the reader by the tag serves to avoid denial-of-service attacks that might be perpetrated against tags by corrupted readers. With the method of an embodiment of the invention, the tag authentication coupon $x_i$ used during a current authentication is not consumed if the reader with which the tag is dialoguing is a corrupted reader. Under such circumstances, the reader is not able to send the tag the authentication coupon $t_i$ of the reader and so the tag does not send the response y enabling authentication of the tag to be finalized.

Advantageously, during the step of the reader obtaining the authentication coupon of the reader, the method of an embodiment of the invention includes a step of the reader extracting from a memory said coupon as precalculated and associated in the memory with the determined index.

In an implementation of an embodiment of the invention, the authentication coupon of the reader is precalculated and previously stored in the reader.

Advantageously, the authentication value is calculated by the tag at the time of authentication.

In an implementation of an embodiment of the invention, the authentication value is calculated for and during the current authentication. Thus, storage space in the tag is optimized. Furthermore, the calculation performed by the tag requires little calculation power.

In an implementation of an embodiment of the invention, the step of the reader authenticating the tag is performed in application of a GPS authentication scheme including precalculation of a predetermined number of authentication coupons of the tag.

In an implementation of an embodiment of the invention, authentication of the tag by the reader relies on the GPS scheme used in a particular "coupon" mode referred to as "reduced coupon" mode. This mode, which constitutes an optimization of the basic GPS scheme, includes precalculation and storage of authentication coupons of the tag. This precalculation and this storage contribute to optimizing the calculations performed by the tag during authentication with a reader, which calculations include regenerating a random number associated with the coupon used, with this being done with the help of a pseudo-random function.

Advantageously, in this implementation, the authentication coupon of the tag is calculated during a configuration stage from a random number obtained by applying to the index a first pseudo-random function using a first regeneration secret key as its parameter, said pseudo-random function and said regeneration key being installed in the tag.

With this implementation in accordance with the "reduced coupon mode" of the GPS scheme, the pseudo-random function PRS and the regeneration key k installed in the tag enable the tag to regenerate the random numbers $r_i$ associated respectively with the coupons $x_i$ that are stored in the tag.

In an implementation of an embodiment of the invention, the step of the reader authenticating the tag then includes also sending a challenge during the step in which the reader sends the coupon.

Advantageously, the coupon constitutes a portion of the challenge.

In this implementation, the coupon is sent as a portion of the challenge c. Thus, this implementation enables a message to be sent that is of smaller size than a message involving sending both the coupon $t_i$ and a challenge c.

Advantageously, the authentication value of the reader is obtained by means of a second pseudo-random function installed in the tag, using a second secret regeneration key as its parameter, and applied to the selected index.

The authentication value calculated by the tag relies on a pseudo-random function that requires little calculation power on the part of the tag. For a device having limited resources, it is an undeniable advantage to avoid storing a set of authentication values prior to performing authentication, with these values being calculated by on-board means, in particular a pseudo-random function incorporated in the tag. Furthermore, in the particular circumstance in which tag authentication relies on the "reduced coupon" mode of the GPS scheme, this pseudo-random function may be selected in such a manner that the calculation resources it requires are, essentially, the same as the resources required by the pseudo-random function used for generating random numbers associated with the coupons.

An embodiment of the invention also provides a radio tag adapted to authenticate a radio reader and to authenticate itself with the reader, the tag comprising:
  means for selecting an index for identifying an authentication coupon of the reader;
  sender means arranged to send data making it possible to determine the tag-selected index for identifying an authentication coupon of the reader;
  receiver means arranged to receive the coupon from the reader;
  means for obtaining an authentication value from the selected index,
  verification means arranged to verify that the coupon received from the reader corresponds to the authentication value that is obtained; and
  authentication means arranged to authenticate the tag with the reader, and used solely in the event that the verification performed by the verification means is successful.

An embodiment of the invention also provides a radio reader adapted to authenticate itself with at least one radio tag and to authenticate the tag, the reader comprising:
  receiver means arranged to receive from the tag data making it possible to determine a tag-selected index for identifying an authentication coupon of the reader;
  means for obtaining the coupon from the determined index;
  sender means arranged to send the coupon to the tag; and
  authentication means arranged to authenticate the tag.

An embodiment of the invention also provides a radio authentication system comprising:
  a radio reader of an embodiment of the invention; and
  at least one radio tag of an embodiment of the invention.

An embodiment of the invention also provides a computer program for installing in a memory of a radio reader, the program including instructions for implementing the steps of the method of mutually authenticating a radio tag and a reader of an embodiment of the invention, which instructions are executed by the reader when the program is executed by a processor.

An embodiment of the invention also provides a data medium having the computer program of the invention stored thereon.

BRIEF DESCRIPTION OF THE DRAWINGS

Numerous details and advantages can be better understood on reading the description of a particular implementation given with reference to the accompanying drawings by way of non-limiting example, in which.

DETAILED DESCRIPTION OF ILLUSTRATIVE EMBODIMENTS

The method of an embodiment of the invention for mutual authentication of a reader with a tag may be used in conjunction with a variety of schemes for authenticating a tag with a reader. Such schemes may be based on public key cryptography or on secret key cryptography. Nevertheless, a known scheme for identifying a tag with a reader, referred to as "GPS", short for "Girault, Paillés, Poupard and Stern", the names of its inventors, is particularly suitable for use in relation with the method of an embodiment of the invention. The GPS scheme is a public key authentication technique. It is a protocol of the "zero-knowledge" type in which security relies on the difficulty of the discrete logarithm in a group. By way of example, implementation of the scheme may rely on cryptography based on elliptical curves.

This scheme is normally used for a device having very little power in terms of memory and/or calculation power, enabling the device to authenticate itself with a second device that has more power. The protocol is such that the cost of authentication for the less powerful device can be greatly reduced by means of a series of optimizations. For example, one optimization of the GPS scheme relies on a so-called "coupon" mode. This mode consists in calculating prior to an authentication session everything that can be calculated in advance, leaving a minimum of operations to be performed during the authentication session proper. This makes the GPS protocol very well adapted to applications based on RFID tags.

Figure 1:
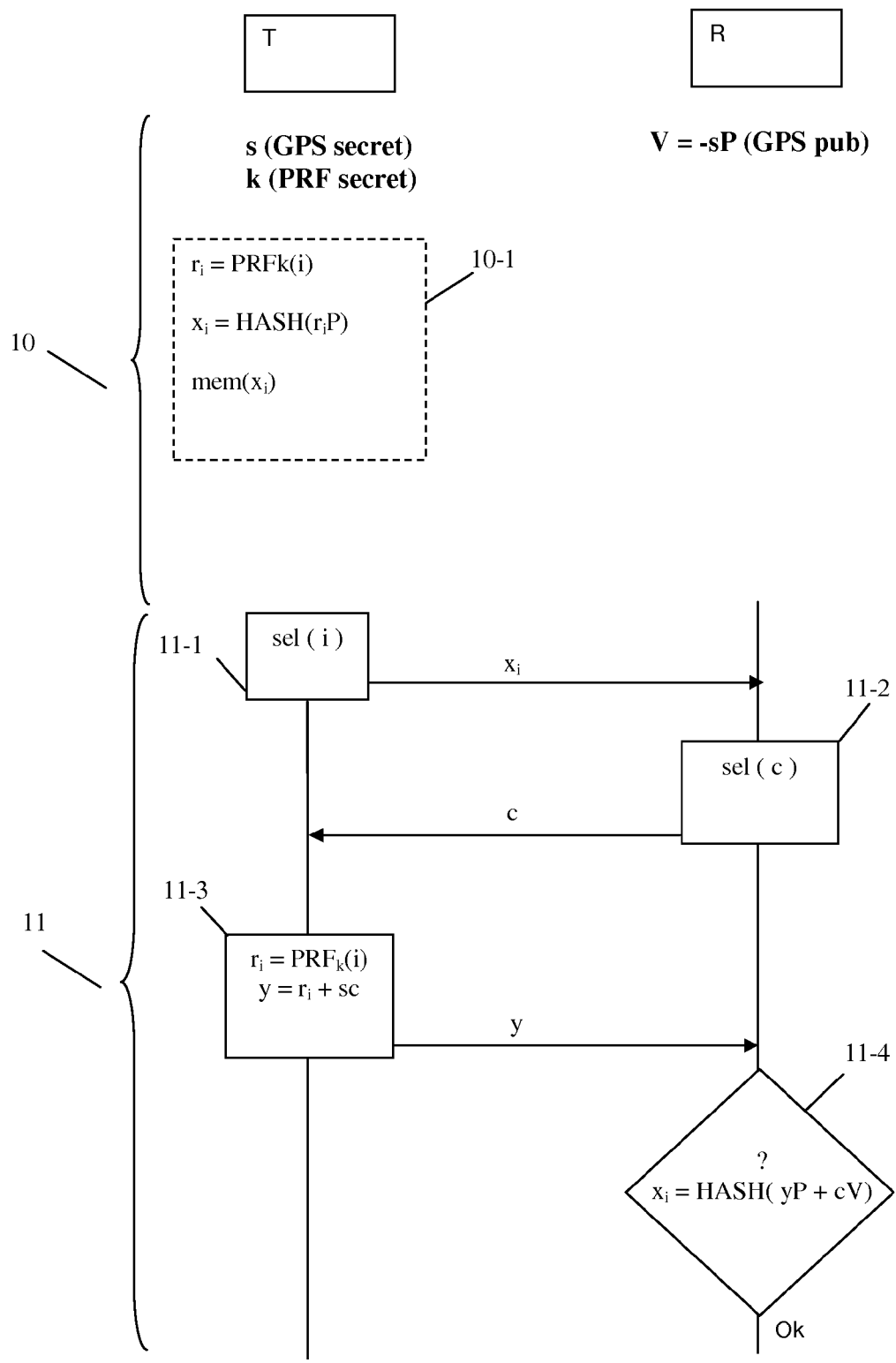
FIG. 1 shows the steps of a known scheme for authenticating a tag with a reader, specifically the GPS scheme, in the prior art.

Thus, initially, there follows a description with reference to FIG. 1 of an implementation of a GPS authentication scheme for authenticating a radio tag with a reader, as used in the prior art. The GPS implementation described herein is based on elliptical curves; it uses a subgroup of points generated by a point P on a curve E. The implementation described herein uses tag authentication coupons and regeneration of random numbers associated with each of these coupons by the tag, where this constitutes an optimization in a basic GPS scheme. In this implementation, arithmetic calculations on elliptical curves are performed by the reader, while only basic arithmetic operations are executed by the tag. It can be understood that this example is very advantageous in terms of performance and of implementation space for the tag.

In this scheme, an authentication system comprises at least one tag T adapted to authenticate itself with a reader R on passing in the proximity of the reader R.

In conventional manner, the scheme comprises two stages: a configuration stage 10 during which authentication data is calculated or/and supplied to the tag T and to the reader R, and an authentication stage 11 during which the tag T authenticates itself with the reader R. The configuration stage 10 need be performed only once in the lifetime of the system. The authentication stage 11 is executed each time the tag is authenticated with the reader R.

During the configuration stage 10, a pair of GPS keys (s, V) is generated. The pair comprises a secret key s and an associated public key V. The secret key s, specific to the tag T, is stored in the tag T and is never extracted, nor transmitted out from the tag T. The public key V is accessible by the reader R. The keys s and V are associated by the following formula: V=−sP, where P is a point on the elliptic curve E known to the reader R. In other words, the public key V is calculated from the scalar product between the secret key s and the point P. In the implementation of the GPS scheme described herein, sometimes referred to as the "reduced coupon" mode, a second secret key k, referred to as the "regeneration" key is installed in the tag T. It is used as a parameter for a pseudo-random function (PRF) that is installed in the tag T.

During the configuration stage 10, in a configuration step 10-1, a predetermined number n of values are precalculated, commonly referred to as authentication coupons of the tag and written $x_i$, for $1 \leq i \leq n$. The coupon of index i is written $x_i$. The index i is an identification index of the coupon $x_i$. In order to calculate the coupon $x_i$, a random number $r_i$ is generated using the pseudo-random function PRF with the parameter given by the regeneration key k and applied to the index i ($r_i$=PRF$_k$(i)). The random numbers $r_i$ (and thus the output from the function PRF) are large in size, e.g. 1100 bits. The authentication coupon $x_i$ of the tag is then calculated using the following formula: $x_i$ =HASH($r_i$P), where HASH is a known hashing function applied to the scalar product between the random number $r_i$ and the point P. Scalar multiplication of the point P by the integer $r_i$, and to a lesser extent evaluation of the hashing function HASH are operations that are expensive in terms of calculation power. Thus, the coupons $x_i$ are usually precalculated by a calculation unit (not shown) of the authentication system, other than the tag T and the reader R. The authentication coupons $x_i$ of the tag are then stored in the tag T, in a memory (not shown) of the tag T, in order to be used during authentication with the reader R.

During the authentication stage 11, in an initial selection-and-sending step 11-1, the tag T selects a coupon $x_i$ of index i. At the end of the step 11-1, the selected coupon $x_i$ is sent to the reader R.

In a step 11-2 of selecting and sending a challenge, the reader R generates a challenge c. The challenge c is generated randomly. At the end of step 11-2, the channel c is sent by the reader R to the tag T.

In a regeneration-and-calculation step 11-3, the random number $r_i$ is regenerated by the tag T. For this purpose, the pseudo-random function PRF installed in the tag T and using the regeneration secret key k as its parameter is applied to the index i that identifies the coupon $x_i$. It is known that the pseudo-random function requires little calculation power for the tag T. The tag T then calculates a response y to the challenge c using the following formula: y=$r_i$+sc. The response y is the sum of the random number $r_i$ and the scalar product between the secret key s and the challenge c. At the end of step 11-3 the response y is sent to the reader R.

In a verification step 11-4, the reader R verifies that the coupon $x_i$ received from the tag at the end of step 11-1 is equal to a value that is obtained by applying the hashing function HASH to the sum of the scalar product between the response y and the point P, plus the scalar product between the challenge c and the public key V: HASH(yP+cV).

If verification is positive (branch Ok in FIG. 1), then the tag T has been correctly authenticated with the reader R.

By way of example, the HASH function is the function SHA-1 ("Secure Hash Algorithm").

After the initialization stage 10, the regeneration secret key k is usually present only in the tag, it never leaves the tag, and it is not intended to be shared with any other entity, except possibly the calculation unit suitable for precalculating the authentication coupons of the tag. The regeneration secret key k is different from the secret key s. Nevertheless, in an implementation of the GPS scheme, it may be derived from the secret key s.

In another implementation of the GPS scheme (not shown) that constitutes another optimization of the scheme, the authentication coupons of the tag $x_i$ are precalculated and stored in the reader, or delivered to the reader by the calculation unit via a communications channel. Under such circumstances, the tag need only transmit the index i of the coupon $x_i$ during the selection and sending step 11-1.

In a variant implementation of the GPS scheme (not shown), the tag authentication coupons that are stored in the tag T are pairs $(x_i, r_i)$, or "non-reduced" coupons. In this variant, the random numbers $r_i$ are thus stored in the tag and are therefore not regenerated during authentication, as is done in the above-described scheme. It should be observed that this variant is less advantageous in terms of occupation of memory space in the tag T, since it requires the tag to store more information.

Figure 2:
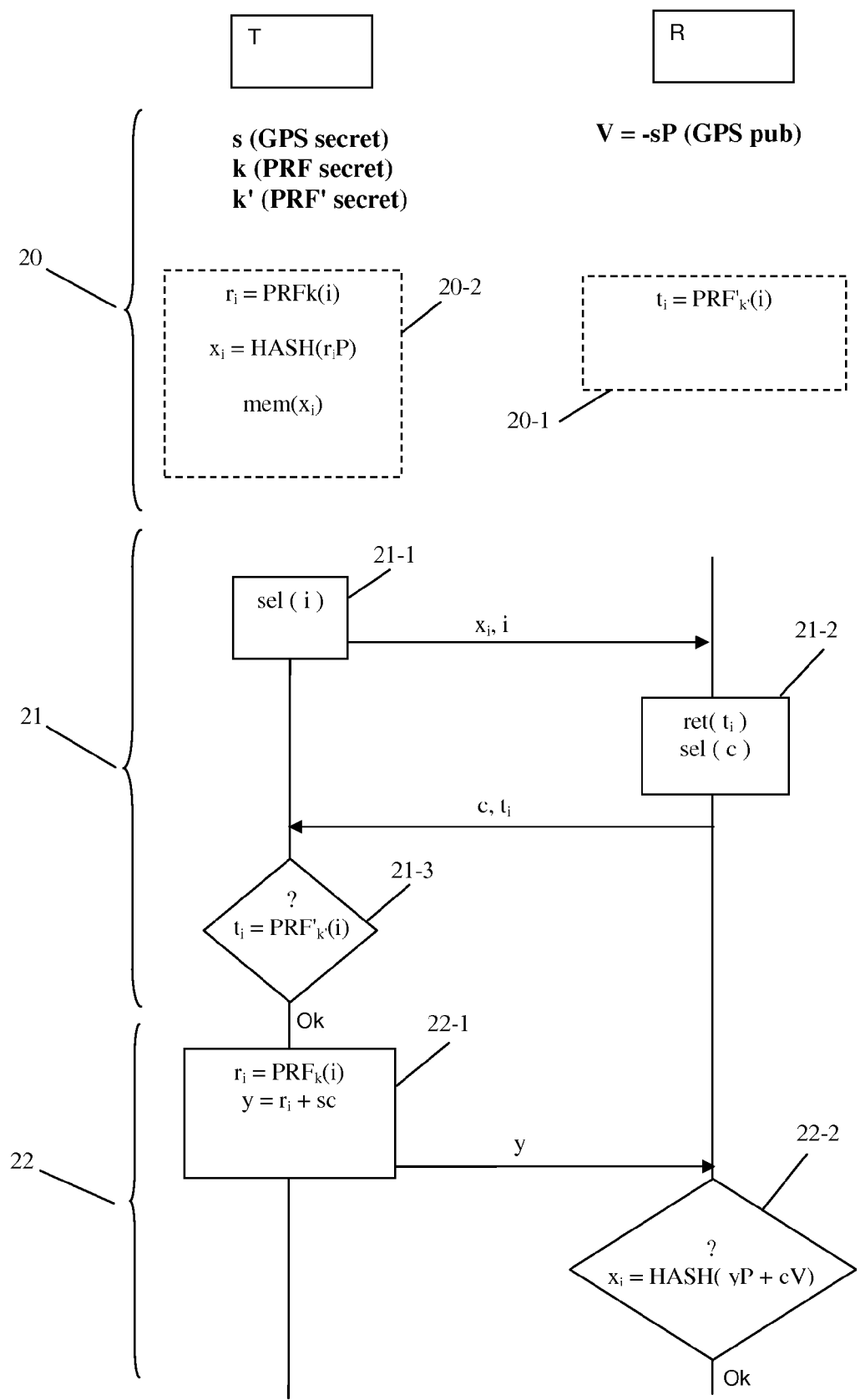
FIG. 2 shows the steps of the method of mutually authenticating a tag and a radio reader in a particular implementation of the invention.

The steps of a mutual authentication method between a radio tag T and a radio reader R in a particular implementation are described below with reference to FIG. 2. Although the mutual authentication method is illustrated herein using the GPS authentication protocol for authenticating the tag T with the reader R, the method is not limited to this example. Thus, the method of an embodiment of the invention may include authenticating the tag T by the reader R in accordance with other techniques for authenticating a tag by a reader. The protocols for authenticating a tag by a reader may be protocols based on public key cryptography or on secret key cryptography.

The method of an embodiment of the invention includes a configuration stage 20 during which authentication data is calculated or/and supplied to the tag T and to the reader R, together with a first authentication stage 21, and where appropriate a second authentication stage 22 during which the reader R is authenticated by the tag T, after which authentication of the tag T by the reader R is finalized. Although the two authentication stages are interleaved, i.e. data exchanged during the first authentication stage 21 is used for performing the second authentication stage 22, for simplification purposes it is assumed that the first authentication stage 21 is dedicated to authenticating the reader by the tag and that the second authentication stage 22 is dedicated to authenticating the tag by the reader. Thus, during the first authentication stage 21, the reader R is authenticated by the tag T. If authentication of the reader R by the tag T succeeds, then mutual authentication continues with the second authentication stage 22 during which finalization of the authentication of the tag T by the reader R is performed.

During the initialization stage 20, a pair of GPS keys (s, V) is generated for the tag T. The pair comprises a secret key s and an associated public key V. The secret key s is stored in the tag T and is never transmitted out from the tag T. The public key V is accessible to the reader R. The keys s and V are associated by the following formula: V =-sP, where P is a point on the elliptic curve E. In other words, the public key V is obtained as the scalar product between the secret key s and the point P. In the implementation of the GPS scheme that is described herein, sometimes referred to as the "reduced" coupon mode, a second secret key k, referred to as the regeneration key for regenerating authentication coupons of the tag, or first regeneration key, and comparable to the secret key k of FIG. 1, is stored in the tag T. It is used as a parameter of a pseudo-random function PRF installed in the tag T. The first regeneration secret key k is different from the secret key s. Nevertheless, it may be derived from the secret key s. A third secret key k', referred to as the regeneration key for regenerating authentication coupons of the reader, or the second regeneration key, is stored in the tag T. It is used as a parameter for a second pseudo-random function PRF', that is installed in the tag T.

In addition, during the configuration stage 20, a predetermined number m of authentication coupons $t_i$ of the reader, for $1 \leq i \leq m$, are calculated and stored in a coupon memory (not shown) that is accessible to the reader R. The authentication coupons t of the reader are calculated beforehand by a calculation unit (not shown) using the following formula: $t_i = PRF'_{k'}(i)$. In other words, each coupon $t_i$ corresponds to the element that results from applying the second function PRF' to the index i. The coupon $c_i$, i.e. the elements output by the function PRF', may for example have a size of 32 bits or of 64 bits. The authentication coupons $c_i$ of the reader are then stored in the coupon memory of the reader R in a step 20-1. It should be observed that in the particular implementation described with reference to FIG. 2, the reader R does not have a second regeneration key k' for regenerating the authentication coupons of the reader, and is therefore not suitable for calculating the authentication coupons $t_i$ of the reader.

During the configuration stage 20, in a configuration step 20-2, comparable to the configuration step 10-1 of FIG. 1, a predetermined number n of authentication coupons $x_i$ for $1 \leq i \leq n$ of the tag are precalculated. In order to calculate a coupon $x_i$, the calculation unit generates a random number $r_i$ by means of the first pseudo-random function PRF using the first regeneration key k as its parameter and applied to the index i ($r_i = PRF_k(i)$). The random numbers $r_i$ (i.e. the elements output by the function PRF using the first regeneration key k as its parameter and applied to the indices i) need to be large in size, e.g. 1100 bits. The authentication coupon $x_i$ of the tag is then calculated using the following formula: $x_i = HASH(r_i P)$. In other words, the coupon $x_i$ is the result of applying the hashing function HASH to the scalar product between the random number $r_i$ and the point P. The coupons $x_i$ are precalculated by the calculation unit and they are stored in the tag T for use during authentications with the reader R.

In the first authentication stage 21, in a selection step 21-1, the tag T selects an index i for the tag authentication coupon $x_i$ and sends data to the reader R for the purpose of determining the value of the index i as used by the tag T, and also the tag authentication coupon $x_i$. In the particular implementation described herein, the data sent is the index i of the coupon $x_i$. In a first variant, the data for determining the index i may be a counter value deduced from i but different from i, the $i^{th}$ state of a linear feedback shift register (LFSR) that is initialized with a non-zero constant. In a second variant, only the coupon $x_i$ is transmitted and enables the reader R to access the index i of the coupon in compliance with an index calculation rule that is known to the reader.

In a step 21-2 of obtaining an authentication coupon of the reader and of generating a challenge, the reader R recovers the precalculated coupon $t_i$ associated with the index i it has received, and generates a challenge c. For example, the authentication coupons $t_i$ of the reader are stored in a table having m entries, with the $i^{th}$ entry comprising the authentication coupon $t_i$ of the reader. At the end of step 21-2, the reader R sends to the tag T the challenge c that has been generated together with the authentication coupon $t_i$ of the reader.

In a verification step 21-3, the tag T calculates an authentication value of the reader R. For this purpose, it applies a second pseudo-random function PRF' using the second regeneration key k' as its parameter at the index i as selected in step 21-1. In other words, it calculates the result of PRF'$_k$, (i). The tag T compares the calculated value with the received reader authentication coupon $t_i$. If the authentication value corresponds to the reader authentication coupon $t_i$, then that means that the reader R has been authenticated.

In a step 22-1 of finalizing authentication, that is specific to the stage 22 of authenticating the tag by the reader, and that is performed solely if the verification undertaken in step 21-3 is positive (branch Ok in FIG. 2), the tag T regenerates the random number $r_i$ and calculates a response y to the challenge it has received from the reader R. The step 22-1 is comparable to the regeneration and calculation step 11-3 of FIG. 1. At the end of step 22-1, the tag T sends the calculated response y to the reader R.

In a verification step 22-2, comparable to the verification step 11-4 of FIG. 1, it is verified that the coupon $x_i$ received from the tag at the end of step 21-1 is equal to the value that is obtained by applying the hashing function HASH to the sum of the scalar product between the response y and the point P, plus the scalar product between the challenge c and the public key V: HASH(yP+cV). If the verification is positive (branch Ok in FIG. 2), then the tag T has been correctly authenticated with the reader R, after authenticating the reader R.

It should be observed that in the implementation described here, the stage 21 of authenticating the reader R by the tag T does not increase the number of messages exchanged between the tag and the reader during authentication of the tag by the reader as shown in FIG. 1. Thus, the mutual authentication applied to the GPS protocol in coupon mode remains a three-pass protocol: the tag sends the tag authentication coupon $x_i$ and the index i, the reader sends a response and a reader authentication coupon $t_i$, and, where appropriate, the tag sends the response to the challenge.

It should be observed that if authentication of the reader R by the tag T fails, then the response y is not sent to the reader R by the tag T. Thus, the coupon $x_i$, although sent to the reader R, is not consumed since no response y is sent subsequently by the tag. Thus, the coupon $x_i$ may be reused during a subsequent authentication. This authentication system can therefore withstand denial-of-service attacks against the tags by corrupt readers attempting to dialog with the tags in order to make them use up their tag authentication coupons.

In an implementation of an embodiment of the invention, the first and second regeneration keys k and k' are identical (k=k'), and the first and second pseudo-random functions PRF and PRF' are derived from a common master pseudo-random function $F_k$ that produces binary words of length Lf that is longer than or equal to the lengths Lt and Lx of the reader authentication coupons $t_i$ and the tag authentication coupons $x_i$. For example, the functions PRF and PRF' are such that: PRF$_k$(i)=F$_k$(2i+1)[1, . . . , Lt], and PRF'$_k$(i)= F$_k$(2i)[1, . . . , Lx] with the convention that for L≤Lf and j an integer, the word constituted by the first L bit of F$_k$(j) is written F$_k$(j)[1, . . . , L].

In another implementation, it is assumed that the size of the output produced by the master function $F_k$ is greater than the sum of the output produced by the first and second pseudo-random functions PRF and PRF'. Thus, in order to obtain PRF$_k$(i) and PRF'$_k$(i), two strings are extracted from $F_k$(i), a first string that corresponds to PRF$_k$(i) and a second string that corresponds to PRF'$_k$(i).

In a third implementation, the first and second pseudo-random functions PRF and PRF' are based on the same algorithm and the respective parameters k and k' of these functions are different, but are derived from a common master key κ. Thus, by way of example, the values of k and k' may be obtained from κ using the following formulas: k=κ and k'=κ⊕1 (modification of the least significant bit of κ).

In these embodiments, it should be observed that the tag does not need more memory space, nor more circuits than a tag implementing the prior art GPS protocol.

In a variant implementation of an embodiment of the invention, the authentication coupons of the reader $t_i$ are calculated on request, i.e. "on-line", in other words a coupon $t_i$ is calculated by the calculation unit from the index i for a current authentication on request of the reader, and is then transmitted to the reader so that it can authenticate itself. In this variant, the reader authentication coupons $t_i$ are not recalculated and then stored in the reader R during the configuration stage 20. In this variant, a coupon is requested by the reader R from the calculation unit during the step 21-3 of obtaining an authentication coupon of the reader. The coupon is sent to the reader R by the calculation unit in response. In a second variant, the authentication coupons $t_i$ of the reader R are recovered from a remote database to which the reader R has access.

In another variant implementation of an embodiment of the invention, in the step 21-2 of obtaining an authentication coupon of the reader and of generating a challenge, the authentication coupon $t_i$ is considered as being part of the challenge c that the reader R sends to the tag. Thus, only the challenge c is transmitted in step 21-2, and it includes the coupon $t_i$. For example, the coupon $t_i$ constitutes the f least significant bits of the challenge c, which comprises l bits. In order to obtain the challenge c, (l-f) most significant bits of the challenge are drawn at random.

It should be observed that in the implementations described herein, the same index i is used to specify an authentication coupon $x_i$ of the tag and an authentication coupon $t_i$ of the reader for use in the method of an embodiment of the invention. Naturally, two different indices may be associated with respective ones of these coupons. Thus, in the method of an embodiment of the invention, an authentication coupon $x_i$ of the tag may have an index i that is different from the index j of the authentication coupon $t_j$ of the reader, as requested by the tag. For example, the value of j may be obtained by the tag from a formula that is known to the tag, and then transmitted to the reader. In order to make the description and the figures easier to read, the same index i has been chosen both for the authentication coupons $t_i$ of the reader and the authentication coupons $x_i$ of the tag.

Figure 3:
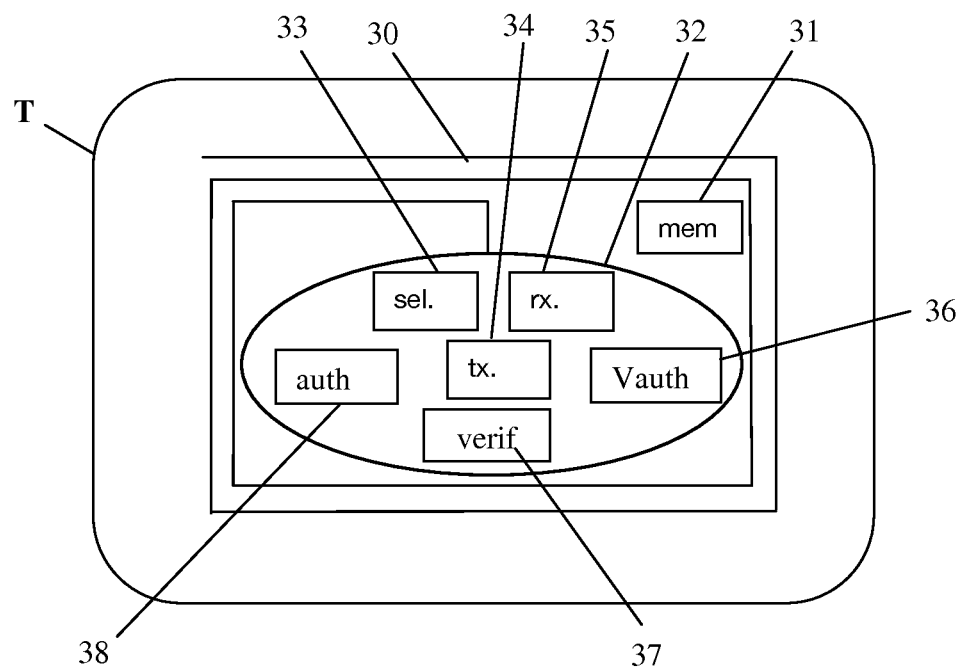
FIG. 3 shows an embodiment of a tag arranged to authenticate a radio reader as shown in FIG. 4.

A radio tag T in a particular embodiment of the invention is described below with reference to FIG. 3. The tag T is adapted to dialog with a radio reader (not shown in FIG. 3) during an authentication sequence in accordance with the steps of the above-described method.

In the particular example described herein, the tag T is a passive device that receives its energy from the radio reader while it is being interrogated thereby. The tag T comprises:

an antenna 30 suitable for sending to the reader and for receiving from the reader;

storage means 31, such as a memory, suitable for storing the secret key s of the pair of GPS keys (s, V), the first regeneration key k, the first pseudo-random function PRF, the second regeneration key k', the second pseudo-random function PRF', and the authentication coupons $x_i$ of the tag once they have been precalculated. In a variant embodiment of the invention, the first and second functions PRF and PRF' use the same calculation resources; and a silicon chip 32 comprising a plurality of transistors suitable for constituting logic gates in a non-programmable hard-wired logic circuit. The hard-wired logic circuit defines:

means 33 for selecting an index, suitable for selecting a coupon index i for identifying an authentication coupon $t_i$ of the reader;

means 34 that are coupled to the antenna 30 and that constitute sender means adapted to send data making it possible to determine an identification index i for an authentication coupon $t_i$ of the reader, said index being selected by the tag by using the selector means 33. The sender means are also suitable for sending to the reader a response y to the challenge received from the reader, which response is calculated by authentication means 38;

means 35 that are coupled to the antenna 30 and that constitute receiver means adapted to receive the coupon $t_i$ from the reader;

means 36 for obtaining an authentication value and arranged to calculate an authentication value from the index i selected by the tag;

verification means 37 arranged to verify that the coupon $t_i$ received from the reader corresponds to the authentication value obtained by the means 35; an authentication means 38 arranged to regenerate the random number $r_i$ and to calculate a response y to the challenge received from the reader R. The means 38 are used in the event of the verification undertaken by the verification means 37 being successful.

The means 33 and 34 are adapted to implement step 21-1.

The means 36 and 37 are adapted to implement above-described step 21-3.

The means 38 are adapted to implement the step 22-1.

Figure 4:
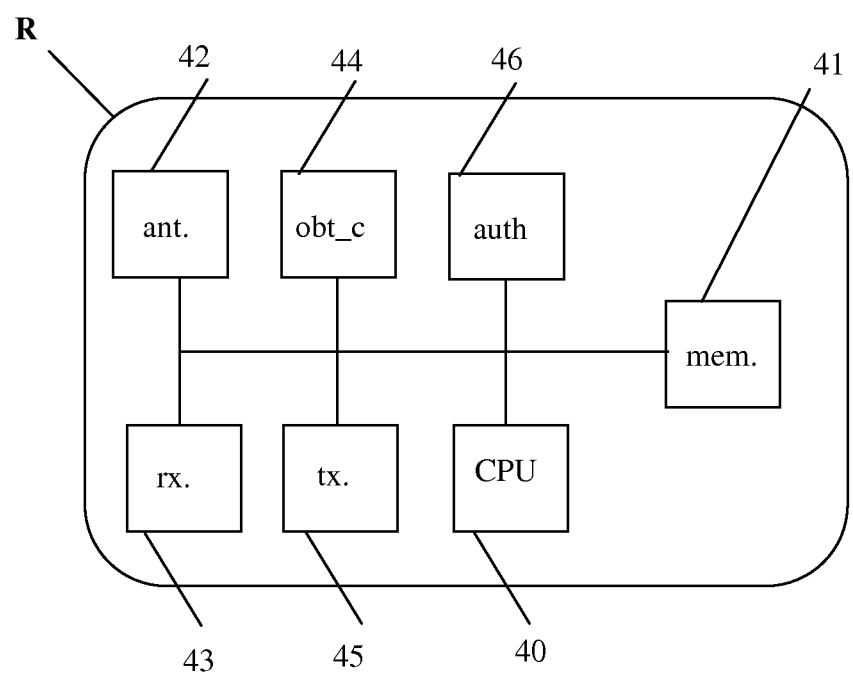
FIG. 4 shows an embodiment of a radio reader arranged to authenticate itself with a radio tag shown in FIG. 3.

A radio reader R in a particular embodiment of the invention is described below with reference to FIG. 4.

The radio reader R is an active device that transmits radio frequencies that activate a tag (not shown in FIG. 4) passing in the proximity thereof by supplying it with the energy it needs. The reader R of an embodiment of the invention is adapted to dialog with the tag during an authentication sequence in accordance with the steps of the method of an embodiment of the invention as described above.

The reader R comprises a plurality of modules:

a processor unit 40 or central processing unit (CPU);

a set of memories, including a volatile random access memory (RAM) 41 used for executing code instructions, for storing variables, etc.;

an antenna 42 suitable for transmitting and receiving by radio;

a receiver module 43 arranged to receive data from the tag and making it possible to determine an identification index i for an authentication coupon $t_i$ of the reader, the index being selected by the tag;

a module 44 for obtaining a coupon, arranged to obtain the coupon $t_i$ from the determined index;

a sender module 45, arranged to send the coupon $t_i$ to the tag. In an implementation of an embodiment of the invention in which the GPS scheme is used to authenticate the tag, the sender module is also adapted to send the challenge c to the tag, together with the coupon $t_i$. In a variant of this implementation, the sender module 45 is adapted to send the coupon $t_i$ as a portion of the challenge c; and an authentication module 46 arranged to authenticate the tag.

In a variant embodiment of the invention, the reader 4 includes communications means (not shown) for communicating with the calculation unit and adapted to request and receive a coupon for a current authentication.

The modules communicate with one another via a communications bus.

The modules 43, 44, and 45 are adapted to implement above-described step 21-2.

The module 46 is adapted to implement the step 22-2.

These are preferably software modules comprising software instructions for executing the steps of the mutual authentication method.

An embodiment of the invention thus also provides:

a computer program including instructions for implementing the method of mutually authenticating a tag and a reader as described above, when the program is executed by a processor; and a reader-readable recording medium having the computer program as described above recorded thereon.

The software modules may be stored in or transmitted by a data medium. By way of example, the medium may be a hardware storage medium, e.g. a compact disk read-only memory (CD-ROM), a magnetic floppy disk, or a hard disk, or indeed a transmission medium such as a signal, or a telecommunications network.

In a particular embodiment of the invention that is not described in detail, the tag T is an active device. The tag T is then fitted with a battery enabling it to transmit signals. Thus, the tag T and the reader R are capable of interacting when spaced apart by a greater distance than when the tag T is a passive device that receives its energy from the reader.

Although the present disclosure has been described with reference to one or more examples, workers skilled in the art will recognize that changes may be made in form and detail without departing from the scope of the disclosure and/or the appended claims.

The invention claimed is:

1. A method of mutually authenticating a reader and a radio tag, the method comprising:

a step of the tag sending data to the reader, the data enabling an index to be determined for identifying a pre-calculated authentication coupon of the reader, the index being selected by the tag;

a step of the reader obtaining the pre-calculated authentication coupon of the reader from the determined index and of the reader sending the pre-calculated authentication coupon of the reader to the tag;

a step of the tag obtaining an authentication value from the selected index and of the tag verifying that the coupon received from the reader corresponds to the authentication value that is obtained, the authentication value of the reader being obtained by a first pseudo-random function installed in the tag, using a first secret regeneration key as its parameter, and applied to the selected index;

if the verification is positive, then a step of finalizing the authentication of the tag by the reader, wherein the authentication of the tag is based on a public key cryptography scheme; and if the verification is negative, interrupting the mutual authentication method.

2. The method according to claim 1, including, during the step of the reader obtaining the pre-calculated authentication coupon of the reader, a step of the reader extracting from a memory said pre-calculated authentication coupon of the reader and associated in the memory with the determined index.

3. The method according to claim 1, wherein the authentication value is calculated by the tag at the time of authentication.

4. The method according to claim 1, wherein the step of the reader authenticating the tag is performed in application of a GPS authentication scheme including pre- calculation of a predetermined number of authentication coupons of the tag.

5. The method according to claim 4, wherein the pre-calculated authentication coupon of the tag is calculated during a configuration stage from a random number obtained by applying to the index a second pseudo-random function using a second regeneration secret key as its parameter, said pseudo-random function and said regeneration key being installed in the tag.

6. The method according to claim 4, wherein during the step of sending the pre-calculated authentication coupon of the reader to the tag, the reader also sends a challenge.

7. The method according to claim 4, wherein a second challenge is sent to the reader by the tag, said second challenge including the pre-calculated authentication coupon of the tag.

8. A radio tag adapted to authenticate a radio reader and to authenticate itself with the reader, the tag comprising:
  means for selecting an index for identifying an pre-calculated authentication coupon of the reader;
  sender means arranged to send data making it possible to determine the tag-selected index for identifying the pre-calculated authentication coupon of the reader;
  receiver means arranged to receive the pre-calculated authentication coupon of the reader;
  means for obtaining an authentication value from the selected index, the authentication value of the reader being obtained by a pseudo-random function installed in the tag, using a regeneration secret key as its parameter, and applied to the selected index;
  verification means arranged to verify that the pre-calculated authentication coupon of the reader corresponds to the authentication value that is obtained; and
  authentication means arranged to authenticate the tag with the reader, and used solely in the event that the verification performed by the verification means is successful, wherein the authentication of the tag is based on a public key cryptography scheme.

9. A radio authentication system comprising:
a radio reader; and
at least one radio tag;
wherein the radio reader comprises:
  receiver means arranged to receive from the tag data making it possible to determine a tag-selected index for identifying a pre-calculated authentication coupon of the reader;
  means for obtaining the pre-calculated authentication coupon of the reader from the determined index;
  sender means arranged to send the pre-calculated authentication coupon of the reader to the tag; and
  authentication means arranged to authenticate the tag; and
wherein the at least one tag comprises:
  means for selecting the index for identifying the pre-calculated authentication coupon of the reader;
  sender means arranged to send data making it possible to determine the tag-selected index for identifying the pre-calculated authentication coupon of the reader;
  receiver means arranged to receive the pre-calculated authentication coupon of the reader;
  means for obtaining an authentication value from the selected index, the authentication value of the reader being obtained by a pseudo-random function installed in the tag, using a regeneration secret key as its parameter, and applied to the selected index;
  verification means arranged to verify that the pre-calculated authentication coupon of the reader corresponds to the authentication value that is obtained; and
  authentication means arranged to authenticate the tag with the reader, and used solely in the event that the verification performed by the verification means is successful, wherein the authentication of the tag is based on a public key cryptography scheme.

* * * * *